(12) United States Patent
Gerhard

(10) Patent No.: US 7,147,490 B2
(45) Date of Patent: Dec. 12, 2006

(54) FIBER-OPTIC ENDFACE CLEANING ASSEMBLY AND METHOD

(75) Inventor: Gregory J. Gerhard, Seattle, WA (US)

(73) Assignee: Westover Scientific, Inc., Mill Creek, WA (US)

( * ) Notice: Subject to any disclaimer, the term of this patent is extended or adjusted under 35 U.S.C. 154(b) by 0 days.

(21) Appl. No.: 10/961,838

(22) Filed: Oct. 8, 2004

(65) Prior Publication Data

US 2005/0105859 A1    May 19, 2005

Related U.S. Application Data

(63) Continuation of application No. 10/199,925, filed on Jul. 18, 2002, now Pat. No. 6,821,025.

(51) Int. Cl.
*G02B 6/36* (2006.01)
(52) U.S. Cl. ...................................... 439/85
(58) Field of Classification Search ................ 385/134, 385/85, 136–137, 52, 76–77, 83
See application file for complete search history.

(56) References Cited

U.S. PATENT DOCUMENTS

| | | |
|---|---|---|
| 1,796,338 A | 3/1931 | Moore |
| 1,939,612 A | 12/1933 | Rose |
| 2,218,738 A | 10/1940 | Boysen |
| 2,318,365 A | 5/1943 | Boysen |
| 2,616,820 A | 11/1952 | Bourgeaux |
| 2,851,008 A | 9/1958 | Rochester |
| 3,118,163 A | 1/1964 | Abberly |
| 3,319,281 A | 5/1967 | Montgomery |
| 3,694,845 A | 10/1972 | Engelsher |
| 3,708,818 A | 1/1973 | Hotz |
| 3,998,012 A | 12/1976 | Ness |
| 4,028,162 A | 6/1977 | Cherin et al. |
| 4,045,121 A | 8/1977 | Clark |
| 4,065,409 A | 12/1977 | Flanagan |
| 4,077,702 A | 3/1978 | Kunze et al. |
| 4,148,559 A | 4/1979 | Gauthier |
| 4,218,133 A | 8/1980 | Biedermann |
| 4,263,692 A | 4/1981 | Gremillion |
| 4,322,127 A | 3/1982 | Comerford et al. |
| 4,428,092 A | 1/1984 | Lipari |
| 4,604,649 A | 8/1986 | Carollo et al. |
| 4,637,089 A | 1/1987 | Schwarz |
| 4,733,428 A | 3/1988 | Malinge et al. |
| 4,767,180 A | 8/1988 | Zajac et al. |
| 4,785,586 A | 11/1988 | Kratfel |
| 4,816,951 A | 3/1989 | Zago |

(Continued)

*Primary Examiner*—J. F. Duverne
(74) *Attorney, Agent, or Firm*—Christensen O'Connor Johnson Kindness PLLC

(57) ABSTRACT

A cleaning apparatus (100) for cleaning an endface (202) of an optical fiber contained within an interface device (200) is provided. The cleaning apparatus includes a housing (110) having an interface portion (116) adapted to be received by the interface device. The cleaning apparatus also includes at least a first nozzle (126) operable to deliver a pressurized gas and a solvent upon the endface to aid in the removal of contaminants on the endface. A method for cleaning an endface of an optical fiber contained within an interface device is also provided. The method comprises the steps of inserting an interface portion within the interface device so as to position a nozzle in proximity to the endface of the interface device. The method further comprises the steps of directing a pressurized gas through the nozzle toward the endface and intermixing a solvent with the pressurized gas.

3 Claims, 9 Drawing Sheets

U.S. PATENT DOCUMENTS

| | | | |
|---|---|---|---|
| 4,850,536 | A | 7/1989 | Teranishi et al. |
| 4,901,142 | A | 2/1990 | Ikuno et al. |
| 4,998,672 | A | 3/1991 | Bordaz et al. |
| 5,023,464 | A | 6/1991 | Mitsuya et al. |
| 5,080,461 | A | 1/1992 | Pimpinella |
| 5,117,528 | A | 6/1992 | Kanayama et al. |
| 5,135,590 | A | 8/1992 | Basavanhally et al. |
| 5,144,775 | A | 9/1992 | Bakanowsky, III |
| 5,148,572 | A | 9/1992 | Wells et al. |
| 5,151,964 | A | 9/1992 | Carpenter et al. |
| 5,210,647 | A | 5/1993 | Hartnagel et al. |
| 5,220,703 | A | 6/1993 | Kanayama et al. |
| 5,226,101 | A | 7/1993 | Szentesi et al. |
| 5,230,032 | A | 7/1993 | Muzslay |
| 5,281,301 | A | 1/1994 | Basavanhally |
| 5,317,661 | A | 5/1994 | Szentesi et al. |
| 5,325,452 | A | 6/1994 | Stein et al. |
| 5,332,157 | A | 7/1994 | Proctor |
| 5,376,446 | A | 12/1994 | Huang |
| 5,381,498 | A | 1/1995 | Bylander |
| 5,381,504 | A | 1/1995 | Novack et al. |
| 5,472,119 | A | 12/1995 | Park et al. |
| 5,487,398 | A | 1/1996 | Ohmi et al. |
| 5,557,696 | A | 9/1996 | Stein |
| 5,573,015 | A | 11/1996 | Williams |
| 5,730,162 | A | 3/1998 | Shindo et al. |
| 5,734,768 | A | 3/1998 | Kim et al. |
| 5,743,468 | A | 4/1998 | Laidler |
| 5,761,758 | A | 6/1998 | Mellon |
| 5,762,238 | A | 6/1998 | Liang |
| 5,768,738 | A | 6/1998 | Lee |
| 5,817,185 | A | 10/1998 | Shindo et al. |
| 5,836,031 | A | 11/1998 | Cox |
| 5,863,211 | A | 1/1999 | Sobotta et al. |
| 5,878,458 | A | 3/1999 | Higginbotham |
| 5,906,686 | A | 5/1999 | McNeil |
| 5,925,191 | A | 7/1999 | Stein et al. |
| 5,956,793 | A | 9/1999 | Cox |
| 6,006,768 | A | 12/1999 | Cox |
| 6,053,985 | A | 4/2000 | Cheswick et al. |
| 6,125,227 | A * | 9/2000 | Cox .................. 385/134 |
| 6,186,670 | B1 | 2/2001 | Austin et al. |
| 6,209,162 | B1 | 4/2001 | Clairadin et al. |
| 6,209,163 | B1 | 4/2001 | Clairadin et al. |
| 6,347,974 | B1 | 2/2002 | Chandler et al. |
| 6,619,854 | B1 | 9/2003 | Kiani |
| 6,839,935 | B1 | 1/2005 | Kiani et al. |
| 2002/0006261 | A1 | 1/2002 | Krow, Jr. et al. |
| 2002/0162582 | A1* | 11/2002 | Chu et al. .................. 134/105 |
| 2003/0169991 | A1 | 9/2003 | Malevanets et al. |

* cited by examiner

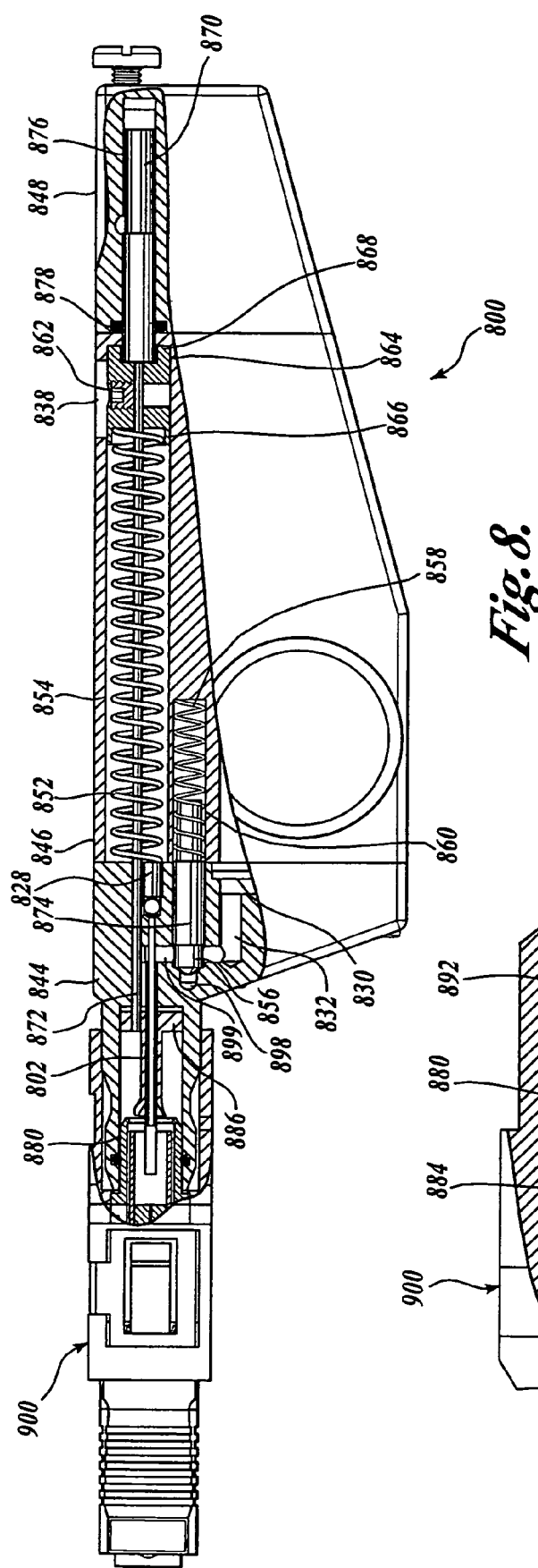
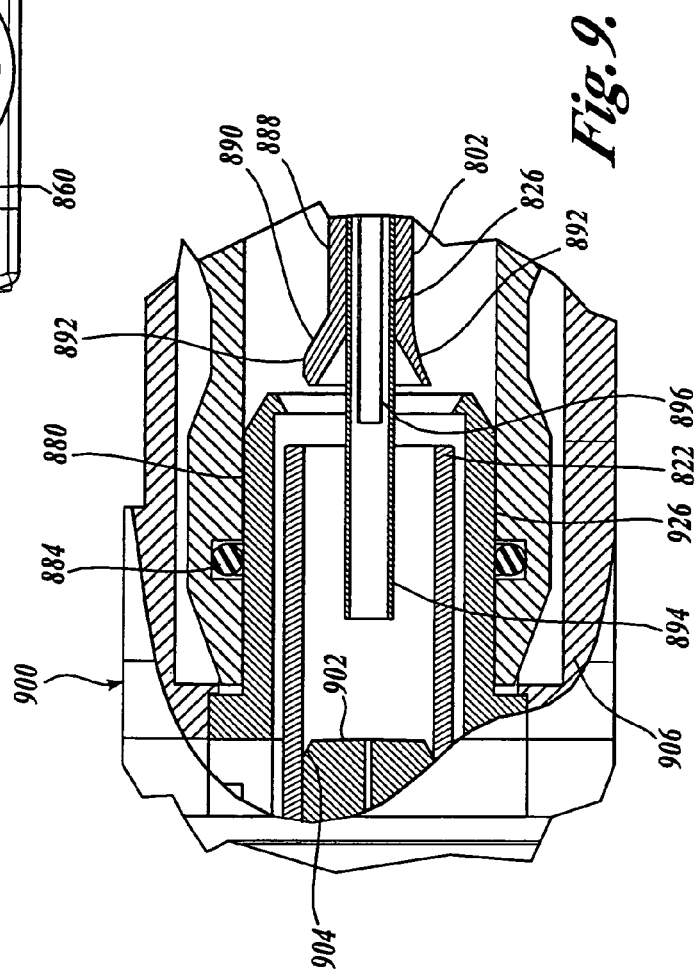

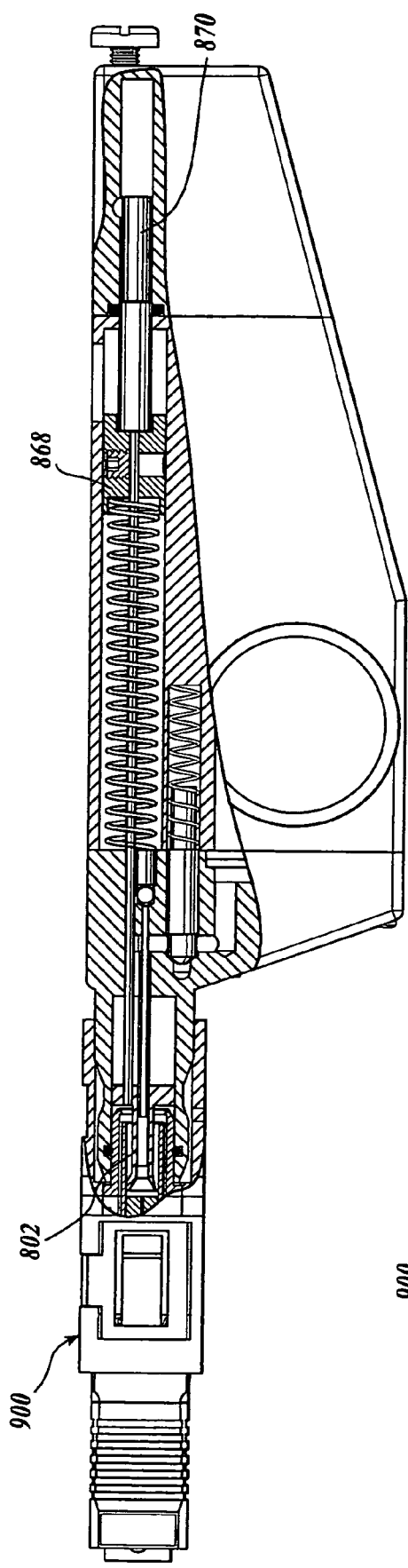
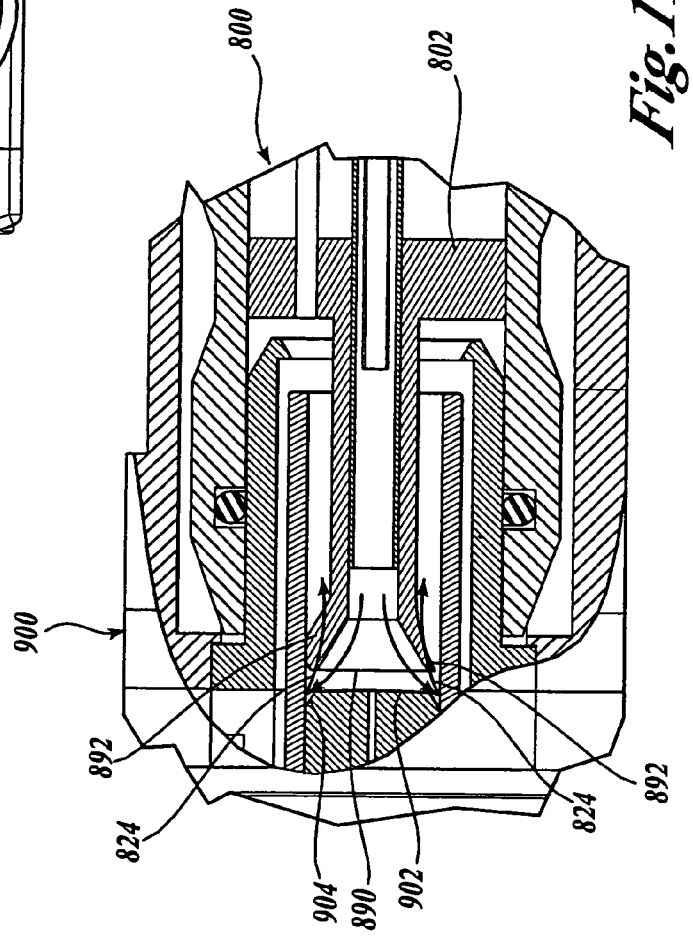
Fig.10.
Fig.11.

FIBER-OPTIC ENDFACE CLEANING ASSEMBLY AND METHOD

CROSS-REFERENCE TO RELATED APPLICATION

This application is a continuation of prior application Ser. No. 10/199,925 filed Jul. 18, 2002, now U.S. Pat. No. 6,821,025, priority from the filing date of which is hereby claimed under 35 U.S.C. § 120.

FIELD OF THE INVENTION

The present invention related generally to fiber-optic cleaning systems and, more specifically, to cleaning systems for cleaning fiber-optic endfaces.

BACKGROUND OF THE INVENTION

The proliferation of fiber-optic communications has led to its widespread implementation and use in industry, especially in the fields of telecommunications and data communications. It is well known in the industry that fiber-optic endfaces must be kept clean and undamaged within fiber-optic communication systems. A fiber-optic endface is the cross-sectional surface that is created when an optical fiber is cut for termination. The fiber-optic endfaces are typically supported by a connector that couples to a bulkhead adapter (also sometimes referred to as a backplane adapter or a mating adapter) having an alignment sleeve for receiving the fiber-optic endface.

Failure to keep an endface clean and undamaged results in signal loss because of scattering effects at the endface of the optical fiber. As bandwidths increase, particularly with the rise of wavelength division multiplexing (WDM) technology, the need for cleanliness at the fiber-optic endface is even more important. Further, since fiber-optic communication systems handle heavy bandwidth traffic, the cleanliness at the fiber-optic endface is particularly important because the laser power driving the fiber-optic communication signals is typically higher. When a high-powered laser strikes a small piece of debris on the fiber-optic endface, the debris burns, leaving a film of soot on the fiber-optic endface that degrades communication signals. As a result, the "dirty" fiber-optic endface at the interconnect point must be taken out of service and repaired.

While cleanliness of the fibers is of utmost importance, access to the fiber endface is often very limited. Most fiber-optic interconnects are arranged in a male-to-male configuration and utilize a female-to-female configured alignment sleeve for coupling. Thus, when the user-side connector is removed, one endface is readily accessible, while the other resides at the bottom of a deep narrow hole. This makes cleaning very difficult. Further, backplane fiber-optic interconnects are notoriously difficult to access for maintenance, cleaning, and repair. Whether multi-fiber or single-fiber (simplex), these fiber-optic connectors are typically located near the back of a narrow "card slot". A typical slot is 1.5 inches wide and 12 inches deep, and rather difficult to access for service. Most current cleaning techniques require the user to disassemble the backplane to gain access to the connector for cleaning.

To overcome the access problem, some cleaning system manufacturers have designed cleaning systems that are insertable within the alignment sleeve for cleaning the fiber-optic endfaces without necessitating the removal of the connector from the bulkhead adapter. However, the methods used by these systems are disadvantageous for several reasons. For instance, most of these methods utilize contact cleaning methods, wherein the endface is directly contacted by a non-fluid material, such as a cotton swab or a physical structure coated with an adhesive. Because the fiber-optic endface is directly contacted by a non-fluid material, these systems contain the inherent risk of adding contamination to the fiber-optic endface as a portion of the non-fluid contact material may remain on the fiber-optic endface. Further, the physical contact may result in the introduction of defects upon the fiber-optic endface, such as scratches on the fiber-optic endface through "brushing" of the media across the fiber-optic endface or the "dragging" of a contaminate particle across the endface. Thus, it is widely understood that contact cleaning methods are one of the leading causes of endface scratching, which often results in signal degradation.

Other cleaning manufacturers have designed cleaning systems that involve injecting a liquid within the bulkhead adapter for cleaning the fiber-optic endfaces without necessitating the removal of the connector from the backplane. However, current methods of this nature are also disadvantageous for several reasons. For instance, a typical bulkhead adapter is not watertight, therefore significant quantities of the liquid, such as water, are leaked from the bulkhead adapter, thereby presenting a potential or a perceived potential for damage to the expensive communication equipment located in proximity to the connector. Further, these systems do not provide an immediate evacuation system for the rapid removal of the liquid injected within the bulkhead adapter, thus increasing the potential for damage to the surrounding communications equipment and increasing the potential for residuals of the fluid to remain on the endface, thus contaminating the endface.

Moreover, it has been found that during cleaning operations, cleaning solvents may collect in a chamfer formed in the fiber-optic endface. The chamfer is located around the periphery of the fiber-optic endface. The chamfer acts as a protected cavity, which ultimately forms a reservoir that retains solvent within the alignment sleeve. Thus, after the cleaning process is complete, the cleaning solvent and any contaminants contained in the chamfer often flow back onto the fiber-optic endface, recontaminating the endface.

Further, existing assemblies do not incorporate an inspection microscope within the cleaning assembly or a means to receive one. Thus, the cycle time to clean and inspect a fiber-optic endface is increased since the operator is forced to swap between the cleaning assembly and an inspection microscope. Further still, the potential for the introduction of contaminants or damage to the fiber endface due to the repetitive coupling and decoupling of the cleaning assembly and inspection microscope during the cleaning process is also substantially increased. In other aspects, a manufacturer must design/develop separate tooling to produce and inventory two separate units, a cleaning assembly and a microscope, resulting in increased costs relative to a combined unit.

Therefore, a need exists for a cleaning assembly that is effective in cleaning fiber-optic endfaces while exhibiting a reduced potential of contamination introduction and/or damage to the fiber-optic endface being cleaned and does not expose nearby components to rogue fluids. Further, there exists a need for a cleaning assembly that is operable to receive or contains a microscope therewithin to reduce the cleaning process cycle time and risk of fiber-optic endface contamination.

SUMMARY OF THE INVENTION

In accordance with one embodiment of the present invention, a cleaning apparatus for cleaning an endface of an optical fiber contained within an interface device is provided. The cleaning apparatus includes a housing having an interface portion adapted to be received by the interface device and a first nozzle at least partially disposed within the housing. The first nozzle is operable to deliver a pressurized gas and a solvent upon the endface of the optical fiber when the interface portion of the housing is received by the interface device to aid in the removal of contaminants on the endface.

In accordance with further aspects of the invention, the cleaning apparatus further includes an evacuation passageway through the housing for removing the pressurized gas and the solvent released from the first nozzle. Preferably, the solvent is a liquid comprised of a hydrocarbon and a terpene mixture. In accordance with still further yet aspects of the invention, the cleaning apparatus may also include a second nozzle disposed at least partially within the housing and operable to dispense the pressurized gas.

In accordance with other aspects of the present invention, the cleaning apparatus further includes a microscope-receiving aperture, wherein the microscope-receiving aperture is operable to selectively receive a microscope for inspecting the endface of the optical fiber. Hence, the cleaning apparatus may also include a microscope attached to the housing via the microscope-receiving aperture, wherein the microscope is adaptable to view the endface.

In accordance with additional aspects of the present invention, the cleaning apparatus further comprises a baffle disposed within the housing and positioned in proximity to the endface when the interface portion of the housing is received by the interface device, the baffle adapted to direct the pressurized gas upon the endface. Further, the baffle may be actuatable between a first position, wherein the baffle is positioned in proximity to the endface for selectively directing the pressurized gas upon the endface, and a second position, wherein the baffle is in a retracted position relative to the endface.

In accordance with still additional aspects of the present invention, a method for cleaning an endface of an optical fiber contained within an interface device is provided. The steps of the method are comprised of inserting an interface portion of a housing of a cleaning apparatus within the interface device so as to position a nozzle at least partially contained within the housing in proximity to the endface of the optical fiber, directing a pressurized gas through the nozzle toward the endface of the optical fiber, and intermixing a solvent with the pressurized gas. The method may also include actuating a baffle disposed within the housing between a first position, wherein the baffle is positioned in proximity to the endface to direct the flow of the pressurized gas upon the endface, and a second position, wherein the baffle is in a retracted position relative to the endface.

Even further, the method may include applying a vacuum to the housing to aid in removal of fluids contained therein. Additional aspects of the method include inspecting the endface of the optical fiber with a microscope having an optical imaging axis that passes through a passageway in the housing while the interface portion of the housing is inserted within the interface device, or removing the interface portion of the housing from the interface device and inserting another portion of the housing containing a microscope within the interface device and inspecting the endface of the optical fiber.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein:

FIG. 8 is a side view of the alternate embodiment of the fiber-optic cleaning assembly depicted in FIG. 6 coupled to a fiber-optic bulkhead adapter, with a portion of the fiber-optic cleaning assembly and fiber-optic connector shown in cross-section, revealing a baffle depicted in a retracted position;

FIG. 9 is a fragmentary cross-sectional view of the alternate embodiment of FIG. 8, showing a magnified perspective of the baffle in a retracted position;

FIG. 10 is a side view of the alternate embodiment of the fiber-optic cleaning assembly depicted in FIG. 6 coupled to a fiber-optic bulkhead adapter, with a portion of the fiber-optic cleaning assembly and fiber-optic connector shown in cross-section, revealing a baffle in an extended position;

FIG. 11 is a fragmentary cross-sectional view of the alternate embodiment of FIG. 10, showing a magnified perspective of the baffle in an extended position.

DETAILED DESCRIPTION OF THE PREFERRED EMBODIMENT

The present invention is a fiber-optic endface cleaning assembly for cleaning the endface of an optical fiber. While not limited to the following application, the cleaning assembly of the present invention is particularly suitable for cleaning an endface of an optical fiber contained in an interface device, which is defined as any assembly, device, or apparatus having an exposed fiber-optic endface therein or supported thereby. Examples of such an interface device include any one or more, or combination of, the following: an alignment sleeve, bulkhead adapter, transceiver, transmitter, detector, or connector. A bulkhead adapter is also sometimes referred to as a "mating adapter" or a "backplane adapter", and their design and configurations vary greatly. For illustrative purposes only, the embodiments of the present invention will be described either in relation to a fiber-optic connector contained within a bulkhead adapter, or alternately, in relation to a fiber-optic connector that has been removed from the bulkhead adapter. However, it should be apparent to one skilled in the art that the fiber-optic cleaning assembly may be used in any situation where an exposed fiber-optic endface is present.

In general, and as will be further described below, the fiber-optic endface cleaning assembly includes a system for applying a pressurized fluid and a cleaning solvent upon a fiber-optic endface. In other embodiments of the present invention, the fiber-optic endface cleaning assembly is operable to receive or includes a microscope for illuminating and viewing the endfaces of optical fibers. In still yet another embodiment of the present invention, the fiber-optic endface cleaning assembly includes a retractable baffle for aiding in the removal of fluids from the fiber-optic endface.

Figure 1:
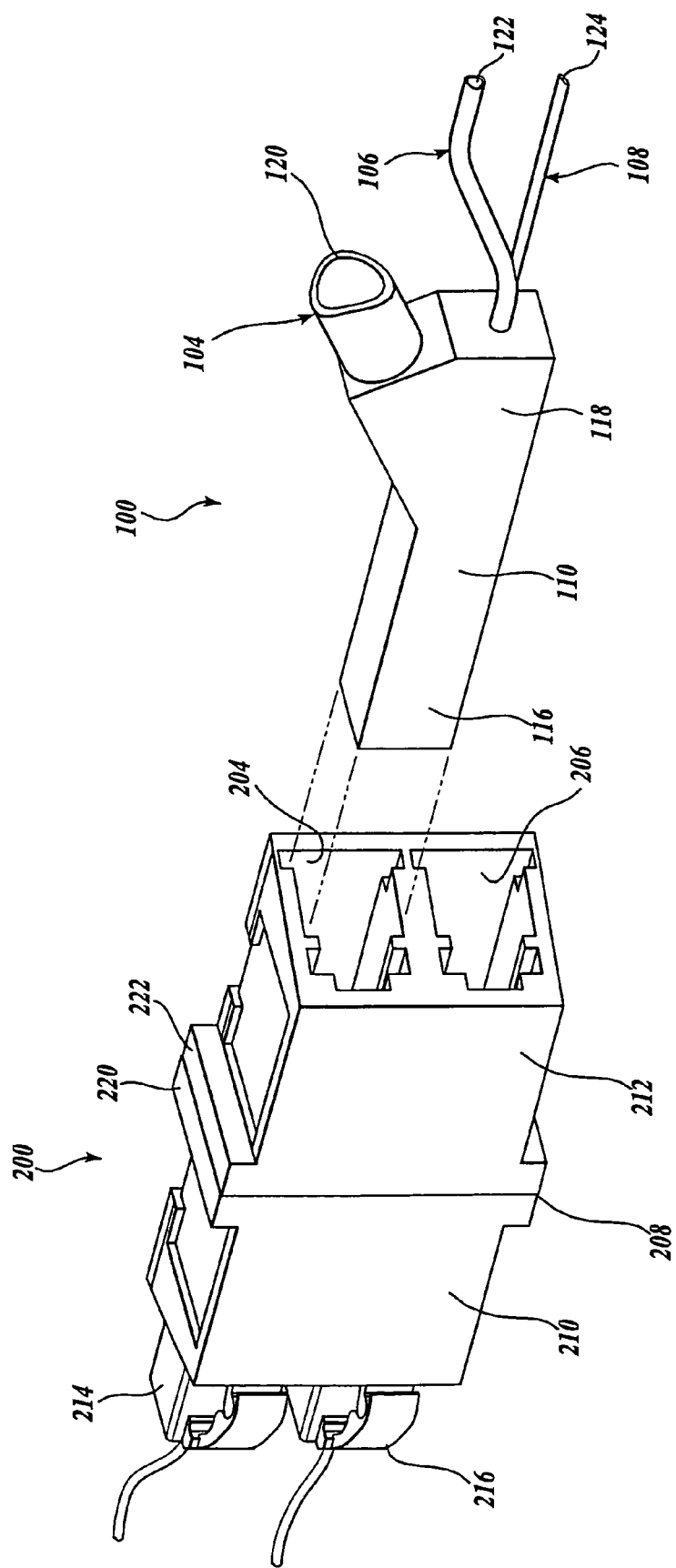
FIG. 1 is a perspective view of one embodiment of a fiber-optic endface cleaning assembly formed in accordance with the present invention, additionally showing a fiber-optic bulkhead adapter with two connectors coupled thereto, of which the fiber-optic endface cleaning assembly is operable to interface with and clean the endfaces of the fiber-optic cables contained therein.
Figure 2:
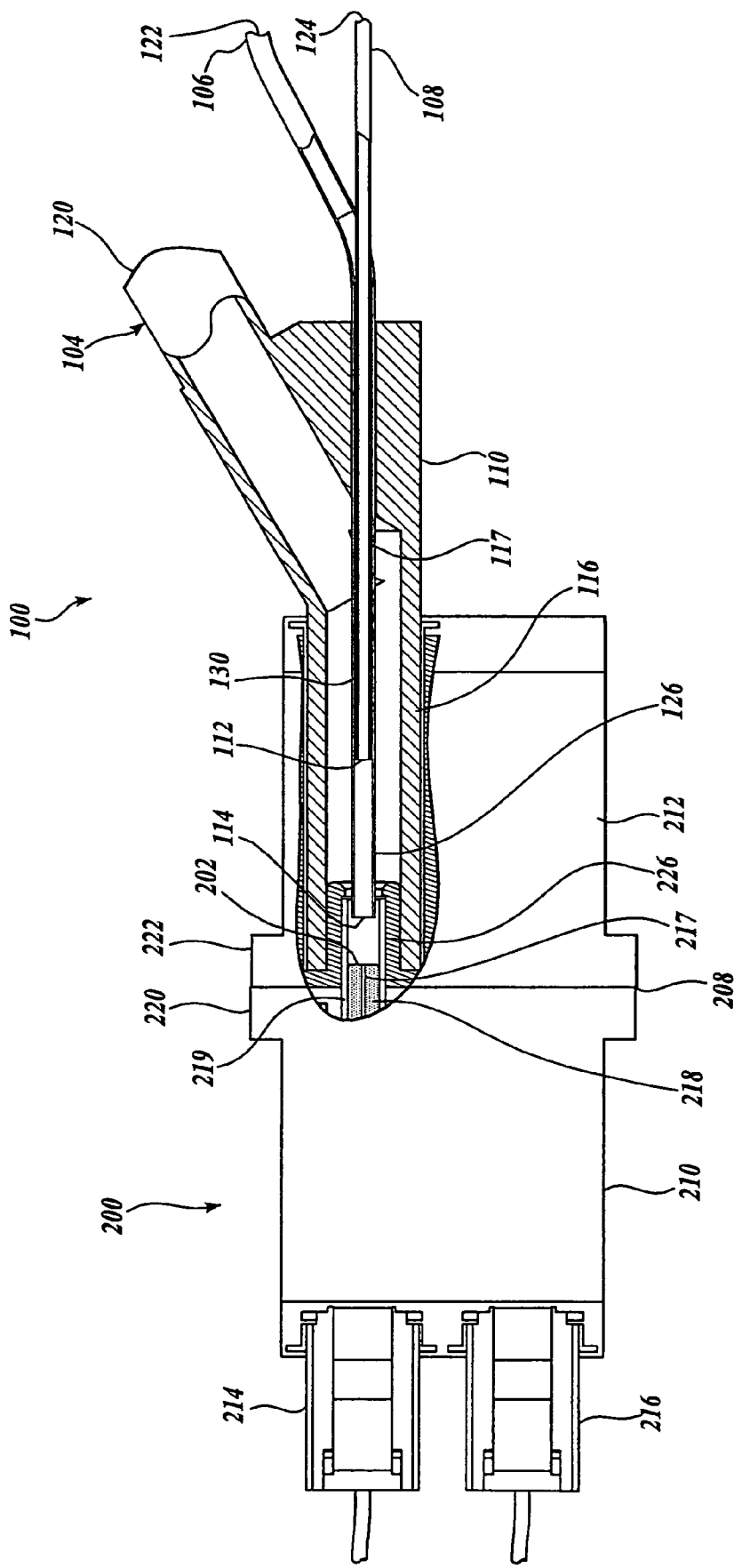
FIG. 2 is a planar fragmentary sectional view of the fiber-optic endface cleaning assembly, the bulkhead adapter and fiber-optic connectors depicted in FIG. 1, wherein the fiber-optic endface cleaning assembly is shown inserted within the bulkhead adapter.

FIGS. 1 and 2 illustrate one embodiment of a fiber-optic endface cleaning assembly 100 formed in accordance with the present invention. The fiber-optic endface cleaning assembly 100 is capable of interfacing with a fiber-optic bulkhead adapter 200, such as those typically used in well known fiber-optics data transmission systems, to clean the endfaces of the optical fibers contained therein. The fiber-optic endface cleaning assembly 100 includes a housing 110, an evacuation system 104, a cleaning solvent delivery system 106, and a pressurized fluid delivery system 108.

Inasmuch as the fiber-optic endface cleaning assembly 100 will be better understood in light of a description of the fiber-optic bulkhead adapter 200 that the cleaning assembly 100 interfaces with, a detailed description of the fiber-optic bulkhead adapter 200 will precede a discussion of the fiber-optic endface cleaning assembly 100. The illustrated fiber-optic bulkhead adapter 200 is suitable for use in most well-known fiber-optics data transmission systems. The fiber-optic bulkhead adapter 200 typically includes a first pair of female inputs 204 and 206 located on a first end of the bulkhead adapter 200. The female inputs 204 and 206 are aligned with a second pair of female inputs (not shown) facing in an opposite direction relative to the first pair of female inputs 204 and 206 on a second end of the bulkhead adapter 200. The female inputs 204 and 206 are sized and configured to receive fiber-optic connectors, such as those referenced by numerals 214 and 216 therewithin. When fiber-optic connectors are received within aligned, opposing female inputs, the optical fibers 217 (one shown) contained within the opposing fiber-optic connectors are received within an alignment sleeve 219 housed within the bulkhead adapter 200. With the connectors received as described, the endfaces of the opposing fiber-optic connectors face one another within the alignment sleeve 219 to permit the passage of optical signals between the optical fibers, as is well known in the art.

In a typical application, the bulkhead adapter 200 is mounted through a bulkhead (not shown) to allow the connection of the optical fibers through the bulkhead. Therefore, while the fiber-optic connectors received within female inputs 204 and 206 may be easily accessed and removed by a user, access to the fiber-optic connectors 214 and 216 is typically blocked by the bulkhead. For instance, the bulkhead adapter 200 may allow passage of the optical fibers through the bulkhead of an amplification unit, wherein to "unplug" the fiber-optic connectors 214 and 216 from the bulkhead adapter 200, one would need to disassemble the amplification unit to access the fiber-optic connectors 214 and 216, a process that is labor intensive and associated with a high potential for equipment damage.

Once the fiber-optic connectors 214 and 216 are inserted into the bulkhead adapter 200, the fiber-optic endfaces 202 associated with each connector are exposed to the other side of the bulkhead and are ready to interface with another fiber-optic connector. In practice, once a fiber-optic connector is removed from one of the female inputs 204 or 206, the fiber-optic endface cleaning assembly 100 of the present invention may be inserted into the empty female input 204 or 206. The fiber-optic endface cleaning assembly 100 may then be used for cleaning the endfaces 202 of each fiber-optic strand 217 terminated within the fiber-optic bulkhead adapter 200.

Still referring to FIGS. 1 and 2 and focusing on the structure of the bulkhead adapter, the fiber-optic bulkhead adapter 200 has an alignment sleeve 219 mounted inside each aligned, opposing pairs of female inputs to receive, retain, and align the optical fibers associated with the fiber-optic connectors received by the female inputs. The fiber-optic connectors 214 and 216 include a ferrule 218 that houses the optical fiber 217 therewithin. The ferrule 218 serves to protect the optical fiber 217 and align the optical fiber 217 within the bulkhead adapter 200 through engagement of the ferrule 218 with the alignment sleeve 219.

The endface 202 of a terminated optical fiber is cut and polished to a high degree of precision for purposes of optimizing signal propagation. Each fiber-optic endface 202 is either "flat" (i.e., orthogonal to the optical axis of the fiber) or cut at an angle. Preferably, each fiber-optic endface 202 is cut at an angle of 8° from vertical (plus or minus 0.1°) to reduce signal degradation caused by reflection.

Many bulkhead adapters 200 are duplex in design, such as shown in FIGS. 1 and 2 allowing for a send and receive channel within a single housing. It should be apparent to one skilled in the art, however, that simplex bulkhead adapters are also quite common and suitable for use in conjunction with the present invention, as well as multiplexes exceeding two.

The bulkhead adapter 200 may include a split housing 208, female inputs 204 and 206 at each end for receiving fiber-optic connectors, such as those referenced by numerals 214 and 216, therewithin. The split housing 208 is generally an elongate hollow block structure formed by joining a first housing half 210 to a second housing half 212 along a pair of opposing mating flanges 220 and 222. Mounted within is the alignment sleeve 219 into which the ferrule 218, and optical fiber 217 are retained and aligned.

In light of the above discussion of the fiber-optic bulkhead adapter 200, the fiber-optic endface cleaning assembly 100 will now be discussed. As stated above, the fiber-optic endface cleaning assembly 100 includes the housing 110, the evacuation system 104, the cleaning solvent delivery system 106, and the pressurized fluid delivery system 108. The housing 110 is comprised of an interface portion 116 coupled to or integrally formed with a tubing receiving portion 118. The interface portion 116 is a hollow elongate block structure having outer dimensions substantially similar to the inner dimensions of the female inputs 204 and 206 of the fiber-optic bulkhead adapter 200 to allow the insertion of the interface portion 116 therein. The interface portion 116 is configured to orient the components of the cleaning solvent delivery system 106 and the pressurized fluid delivery system 108 contained within the interface portion 116 so that any fluid discharged therefrom will properly impinge the fiber-optic endfaces 202, as will be discussed in further detail below.

Joined to the interface portion 116 is the tubing receiving portion 118. The evacuation passageway 120, cleaning solvent tubing 122, and pressurized fluid tubing 124 pass through the tubing receiving portion 118. The tubing receiving portion 118 is a triangular block structure, preferably solid in construction with exception of the tubing passing therethrough.

The evacuation system 104 is comprised of the evacuation passageway 120 coupled to a vacuum pump (not shown) by well known flexible tubing (not shown.) The vacuum pump may be any well known pump that has sufficient capacity to maintain a negative pressure within the alignment sleeve 219 during cleaning, despite the injection of a pressurized fluid therein. Preferably, a low level of vacuum is applied to mitigate the entrance of contaminants exterior of the connector through infiltrating cracks or other openings in the connector. One such vacuum pump suitable for use with the present invention is a single stage venturi pump, Model No. AVR046H, manufactured by Air-Vac, located in Seymour, Conn. The pump is capable of producing vacuum flow rates up to 118 ml/sec. The passageway 120 passes through the tubing receiving portion 118 of the housing 110 at an angle relative to the horizontally oriented interface portion 116 of the housing 110. As the evacuation passageway 120 passes through the interface portion 116 of the housing 110, the evacuation passageway 120 is defined by the inner walls of the interface portion 116 of the housing 110. In the embodiment illustrated, the inner diameter of the evacuation passageway 120 within the interface portion 116 is equal to the outer dimensions of a protective housing 226 that encompasses the alignment sleeve 219 and related fiber-optic endfaces 202, although any diameter that allows adequate volume flow is acceptable.

The pressurized fluid delivery system 108 is comprised of a fluid pressurization unit (not shown), the pressurized fluid tubing 124, and a pressurized fluid nozzle 130. The fluid pressurization unit delivers a pressurized fluid via flexible tubing (not shown) to the pressurized fluid tubing 124 for discharge from the pressurized fluid nozzle 130. The fluid pressurization unit may be any well known pump or other source that has a sufficient capacity to maintain sufficient flow under sufficient pressure during cleaning. In the illustrated embodiment, a pressurized fluid is delivered within a range of 15 psi to substantially greater values, with a preferred value of 100 psi, for three seconds at a flow rate of 112 ml/sec. In one embodiment, the pressurized fluid is a pressurized gas provided by selectively releasing pressurized nitrogen from well known commercially available pressurized nitrogen bottles. In another embodiment, the fluid is a pressurized gas such as dry filtered air provided by a well known compressor or pump. Although in the illustrated embodiment, the pressurized fluid is described as either nitrogen or air, it should be apparent to one skilled in the art that other fluids are suitable for use with the present invention, such as liquids and fluids with entrained solid particles. Further, it should be understood that within the meaning of this detailed description, the term "pressurized gas" includes gaseous compounds that may have small amounts of liquids contained therein, such as air having a humidity other than zero. Further still, although a specific pressure, duration and flow rate suitable for use with the present invention have been described for illustrative purposes, it should be apparent to one skilled in the art that these quantities are descriptive in nature. Therefore, other quantities are suitable for use with the present invention and within the scope of the invention.

The pressurized fluid tubing 124 terminates in a pressurized fluid nozzle 130. The pressurized fluid nozzle 130 is made from any suitable rigid material, such as stainless steel hypodermic needle tubing. In the illustrated embodiment, the nozzle is comprised of extra thin wall, 26-gauge hypodermic needle tubing having an outside diameter of 0.018 inches and an inside diameter of 0.014 inches. The pressurized fluid nozzle 130 includes a pressurized fluid discharge port or nozzle tip 112 at the distal end of the pressurized fluid nozzle 130.

In the illustrated embodiment the pressurized fluid is preferably filtered through a well known filter arrangement, one such suitable filter arrangement being a reusable syringe filter housing utilizing a fine porosity, medium-fast flow rate, 1.0 μm size particle retention, 13 mm glass fiber membrane, Model No. 66073, manufactured by Pall Gelman Laboratory, located in Ann Arbor, Mich.

The cleaning solvent delivery system 106 is comprised of cleaning solvent tubing 122 coupled to a cleaning solvent storage source (not shown). The cleaning solvent tubing 122 is coupled in fluid communication with a solvent storage source or delivery system (not shown) via flexible tubing (not shown). The cleaning solvent tubing 122 terminates in a nozzle 126 having a discharge port or nozzle tip 114 at the distal end of the nozzle 126 for delivery of the pressurized gas and cleaning solvent upon the fiber-optic endface 202. The cleaning solvent tubing 122 passes in line with the centerline of interface portion 118 through both the tubing receiving portion 118 and the interface portion 116 of the housing 110.

The cleaning solvent tubing 122 may be made from any suitable rigid material, such as stainless steel hypodermic needle tubing. In the illustrated embodiment, the nozzle is comprised of extra thin wall, 20-gauge hypodermic needle tubing having an inside diameter of 0.028 inches. The inside diameter is selected to allow the pressurized fluid tubing 124 to pass therethrough and sufficiently oversized to result in the formation of an annulus 117 between the outer surface of the pressurized fluid tubing 124 and the inner surface of the cleaning solvent tubing 122. A venturi effect caused by the passage of pressurized fluid through the pressurized fluid nozzle 130 draws cleaning solvent from the cleaning solvent storage source (not shown), through flexible tubing connecting the cleaning solvent storage source to the cleaning solvent tubing 122, and through the annulus 117 for eventual discharge from the nozzle tip 114. Further, although in the illustrated embodiment the pressurized fluid tubing 124 is depicted running concentrically within the cleaning solvent tubing 122, it should be apparent to one skilled in the art that other configurations are suitable for use with the present invention. For instance, the cleaning solvent tubing 122 may run within the pressurized fluid tubing 124. Alternately, the cleaning solvent tubing 122 and the pressurized fluid tubing 124 may be separate and distinct units directed at the endface and/or directed to discharge into the flow path of the other, as should be apparent to one skilled in the art.

It should also be apparent to one skilled in the art that any suitable cleaning solvent able to effectively remove contaminants contained on the endface of the fiber-optic strand is suitable for use in the present invention. The cleaning solvent may be a gas, liquid, solid or a combination thereof. Preferably, the cleaning solvent, if a liquid, has a flashpoint above 50 degrees Celsius. The cleaning solvent may be heated to increase the efficiency of the cleaning solvent. One suitable cleaning solvent is a hydrocarbon and terpene blend solvent, manufactured by American Polywater Corporation, located in Stillwater, Minn., sold under the trademark HP™, product number HPV-16LF. The hydrocarbon and terpene blend is comprised of a medium aliphatic petroleum solvent and a monocyclic terpene. In another embodiment, the cleaning solvent is a cyanide gas, capable of dissolving some plastics. In yet another embodiment, the cleaning solvent is a liquid with soft suspended solids therein.

In the illustrated embodiment, the cleaning solvent is delivered by means of a venturi effect caused by the passing of the pressurized fluid through the pressurized fluid nozzle 130. In another embodiment, the cleaning solvent is delivered by a pump. One such suitable pump is a solenoid operated diaphragm pump, manufactured by Clark, located in Hudson, Mass., Model No. DMS 035. The pump is capable of providing a fluid at 5 psi at a flow rate of 160 ml/min. Although a specific pump has been described that is suitable for use with the present invention, it should be apparent to one skilled in the art that any such suitable pump may be used with the present invention without departing from the scope of the invention.

In the illustrated embodiment, approximately 25 microliters of cleaning solvent are delivered per three second cleaning blast. Nonetheless, it should be apparent to one skilled in the art that other quantities and durations are suitable for use with the present invention, and are therefore within the scope of the invention. In the present embodiment the cleaning solvent discharge port or nozzle tip 114 is preferably located approximately 0.025 inches to 0.200 inches from the endface. However, it should be apparent to one skilled in the art that other distances are appropriate for use with the present invention. It should also be apparent to one skilled in the art that the spacing of the nozzle tip 114 from the endface affects the back pressure and the effectiveness of the cleaning ability of the present invention. More specifically, if the nozzle tip 114 is placed too close to the endface, back pressures escalate, decreasing the effectiveness of the cleaning operation. On the other hand, if the nozzle tip 114 is displaced too far from the endface, the energy of the jet is dissipated prior to impacting the endface 202, thereby significantly reducing the cleaning effectiveness of the apparatus. In the illustrated embodiment, a spacing of 0.05 inches is preferred.

In the illustrated embodiment, the cleaning solvent is also preferably filtered through a well known filter arrangement, one such suitable filter arrangement being a reusable syringe filter housing utilizing a fine porosity, medium-fast flow rate, 1.0 μm size particle retention, 13 mm glass fiber membrane, Model No. 66073, manufactured by Pall Gelman Laboratory, located in Ann Arbor, Mich.

Still referring to FIGS. 1 and 2, in light of the above description of the fiber-optic endface cleaning assembly 100, the operation of one embodiment of the fiber-optic endface cleaning assembly 100 during a typical cleaning cycle will now be described. First, a fiber-optic connector is removed from the female input 204 and the interface portion 116 of the cleaning assembly 100 is inserted therewithin. The cleaning process is then initiated by pressing a button or similar actuator (not shown). Dry, filtered air at 100 psi is applied at a rate of 112 ml/sec in 3-second bursts through the pressurized fluid tubing 124. Approximately 25 ml of a cleaning solvent comprised of a liquid hydrocarbon and terpene solvent mixture is drawn through the cleaning solvent delivery tubing 122 in approximately the first 100 milliseconds by a venturi effect created by the flow of filtered air through the pressurized fluid nozzle 130.

The pressurized air mixes with the cleaning solvent, thereby creating an aerosol mist of cleaning solvent entrained in a high-speed gas jet. The aerosol mist of cleaning solvent and pressurized gas is discharged through the discharge port 114 of the cleaning solvent nozzle 126. The discharge port 114 is located approximately 0.025 inches to 0.200 inches from the endface with the preferred distance being 0.05 inches. The aerosol mist of cleaning solvent and pressurized gas impinges the endface 202, removing any contaminants located thereupon. Vacuum is applied throughout the entire procedure and for a period thereafter through the evacuation passageway 120 at a rate of approximately 118 ml/sec, thus removing any spent pressurized gas and cleaning solvent, and maintaining the inner portions of the connector 200 slightly below atmospheric pressure. A drying phase, comprising the application of pressurized gas and evacuation vacuum upon the endface, may be initiated following the cleaning evolution to aid in the removal of any residual cleaning solvent that remains within the alignment sleeve 219. Although specific quantities, such as pressures, flow rates, durations, and fluids are disclosed above, it should be apparent to one skilled in the art that other quantities and fluids are suitable for use with the present invention, and are therefore within the scope of the invention.

Figure 3:
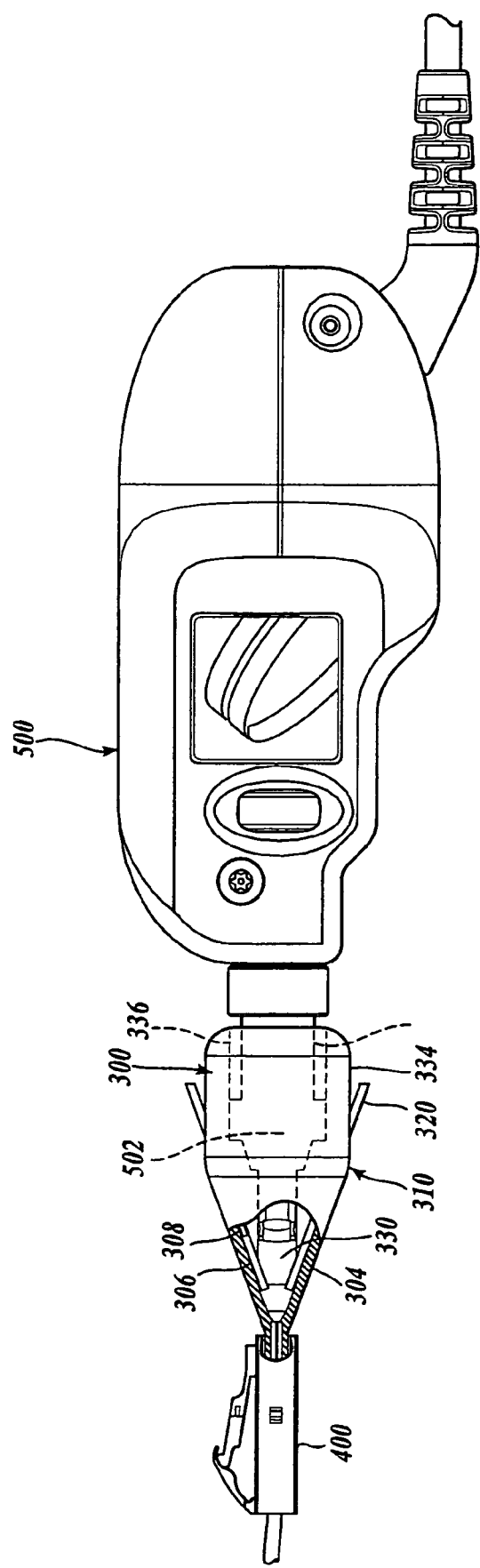
FIG. 3 is a planar elevation view of an alternate embodiment of a fiber-optic endface cleaning assembly formed in accordance with the present invention, shown interfacing with a fiber-optic connector, wherein a microscope is received within the fiber-optic endface cleaning assembly.
Figure 4:
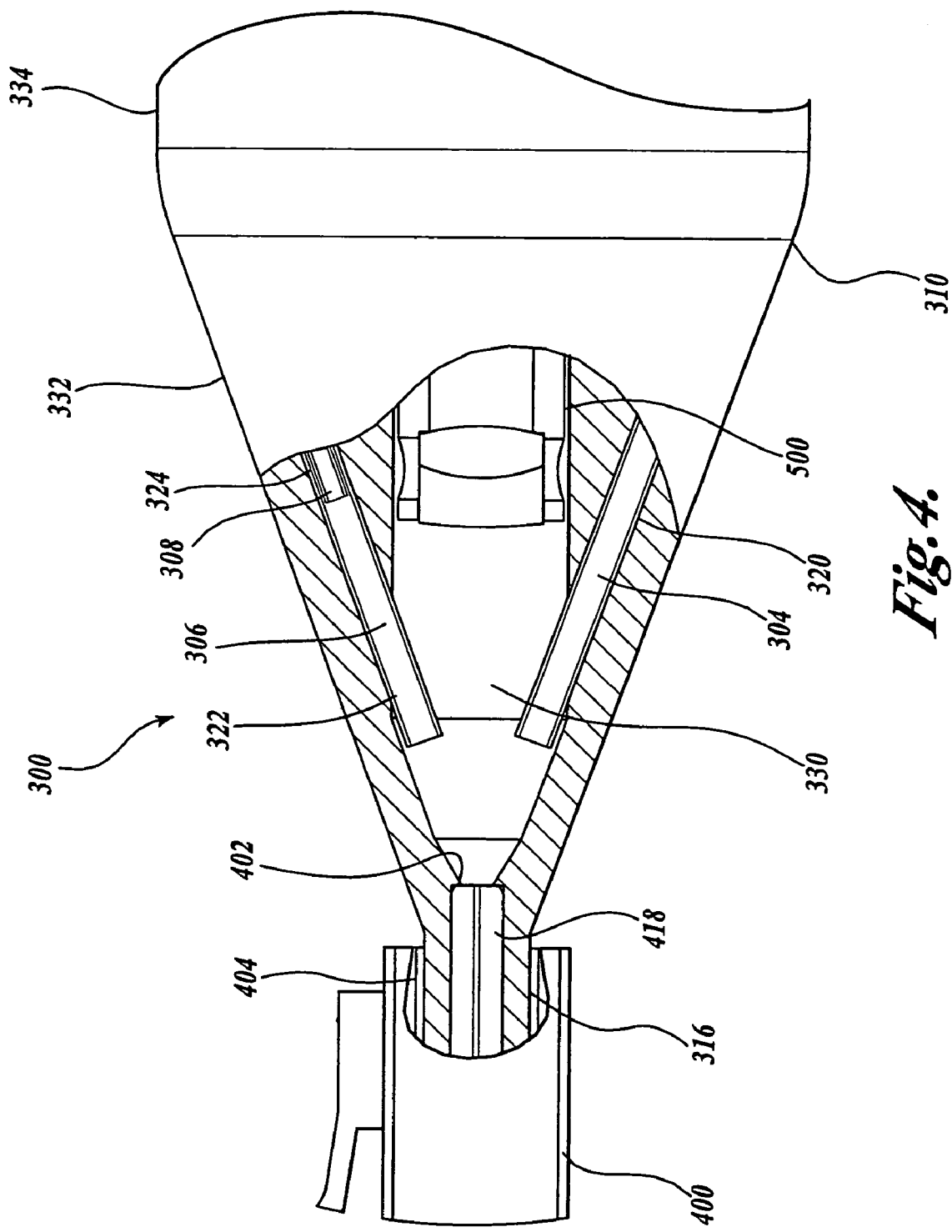
FIG. 4 is a fragmentary detail view of the head portion of the alternate embodiment of the fiber-optic endface cleaning assembly depicted in FIG. 3.

Referring now to FIGS. 3 and 4, an alternate embodiment of a fiber-optic endface cleaning assembly 300 formed in accordance with the present invention will now be described. The fiber-optic endface cleaning assembly 300 is capable of interfacing with a fiber-optic connector 400, such as the fiber-optic connectors 214 and 216 shown in FIGS. 1 and 2, to clean the endfaces of the optical fiber(s) contained therewithin. The fiber-optic endface cleaning assembly 300 of this embodiment is similar to the embodiment described above and depicted in FIGS. 1 and 2, with the exception that the fiber-optic endface cleaning assembly 300 is designed to provide a pathway 330 through which an optical imaging axis of a microscope 500 may extend for viewing the endface 402 of the connector ferrule 418 contained within the fiber-optic connector 400, and also with the exception that the cleaning is performed once the connector 400 is removed from the bulkhead adapter. Since the optical features of the microscope 500 and the general knowledge of the optical nature of the microscope 500 are well known, these aspects of the microscope 500 will not be further discussed herein.

The fiber-optic endface cleaning assembly 300 includes an evacuation system 304, a cleaning solvent delivery system 306, and a pressurized fluid delivery system 308, all of which are substantially similar to those described for the above embodiment. Although an active evacuation system 304 is depicted in this embodiment substantially similar to the system described for the above embodiment, it should be apparent to one skilled in the art that the method of removing debris in this configuration may be done in either an active (vacuum) or passive (vent) manner. Specifically, it should be apparent to one skilled in the art that the evacuation system 304 may alternately accomplish the removal of debris through simply passively venting any fluids discharged upon the endface through a suitably designed evacuation system, as opposed to actively applying a vacuum in proximity to the endface as was disclosed for the previous embodiments.

The housing 310 of the cleaning assembly 300 is formed by joining or integrally forming a hollow cone-shaped section 332 to an axially aligned hollow cylindrically shaped section 334. The cone shaped section 332 includes an interface portion 316. The interface portion 316 is a hollow elongate block structure having inner dimensions substantially similar to the outer dimensions of the ferrule 418 of the fiber-optic connector 400 to allow the insertion of the ferrule 418 therein. It should be apparent to one skilled in the art that a similar configuration wherein the interface portion 316 is designed to interface with inner dimensions of a female input of a bulkhead adapter is a clear extension of this embodiment. The interface portion 316 is configured to orient the components of the cleaning solvent delivery system 306 and the pressurized fluid delivery system 308 contained within the cone-shaped section 332 so that any fluid discharged therefrom will properly impinge the fiber-optic endface 402, as will be discussed in further detail below. The cone-shaped section 332 allows the placement of the components of the cleaning solvent delivery system 306, pressurized fluid delivery system 308, and evacuation system 304 out of the optical pathway 330 of the microscope 500.

Joined to the cone-shaped section 332 is the cylindrically shaped section 334. The evacuation passageway 320, cleaning solvent tubing 322, and pressurized fluid tubing 324 pass through the cylindrically shaped section 334. The cylindrically shaped section 334 further includes a receiving aperture 336 for receiving a head portion 502 of the microscope 500 therewithin. When the head portion 502 of the microscope 500 engages the receiving aperture 336 during insertion within the housing 310, the receiving aperture 336 serves to align the optical imaging axis of the microscope 500 through the optical pathway 330 that passes through the housing 310 and upon the endface 402 of the fiber-optic strand, allowing the user to view the fiber-optic endface 402. In this embodiment, the microscope 500 is inserted after the completion of a cleaning cycle to inspect and view the endfaces 402 of the optical fiber to verify the effectiveness of the cleaning cycle.

Although in the illustrated embodiment, the microscope 500 is a separate unit operable to removably engage the cleaning assembly 300, it should be apparent to one skilled in the art that the microscope 500 may be integrally formed or otherwise permanently affixed to the cleaning assembly 300 without departing from the scope of the invention. Within this alternate embodiment, the user would be able to view the endface during the cleaning cycle or shortly thereafter without removal of the cleaning assembly 300 from the fiber-optic connector 400.

The operation of the alternate embodiment of the cleaning assembly 300 depicted in FIGS. 3 and 4 is substantially similar in operation to the cleaning assembly embodiment described above and depicted in FIGS. 1 and 2 with exception of the use of the microscope 500 and the orientation of the evacuation system 304, the cleaning solvent delivery system 306 and the pressurized fluid delivery system 308. Inasmuch as the operation is substantially similar to that described above, it will not be further discussed herein.

Figure 5:
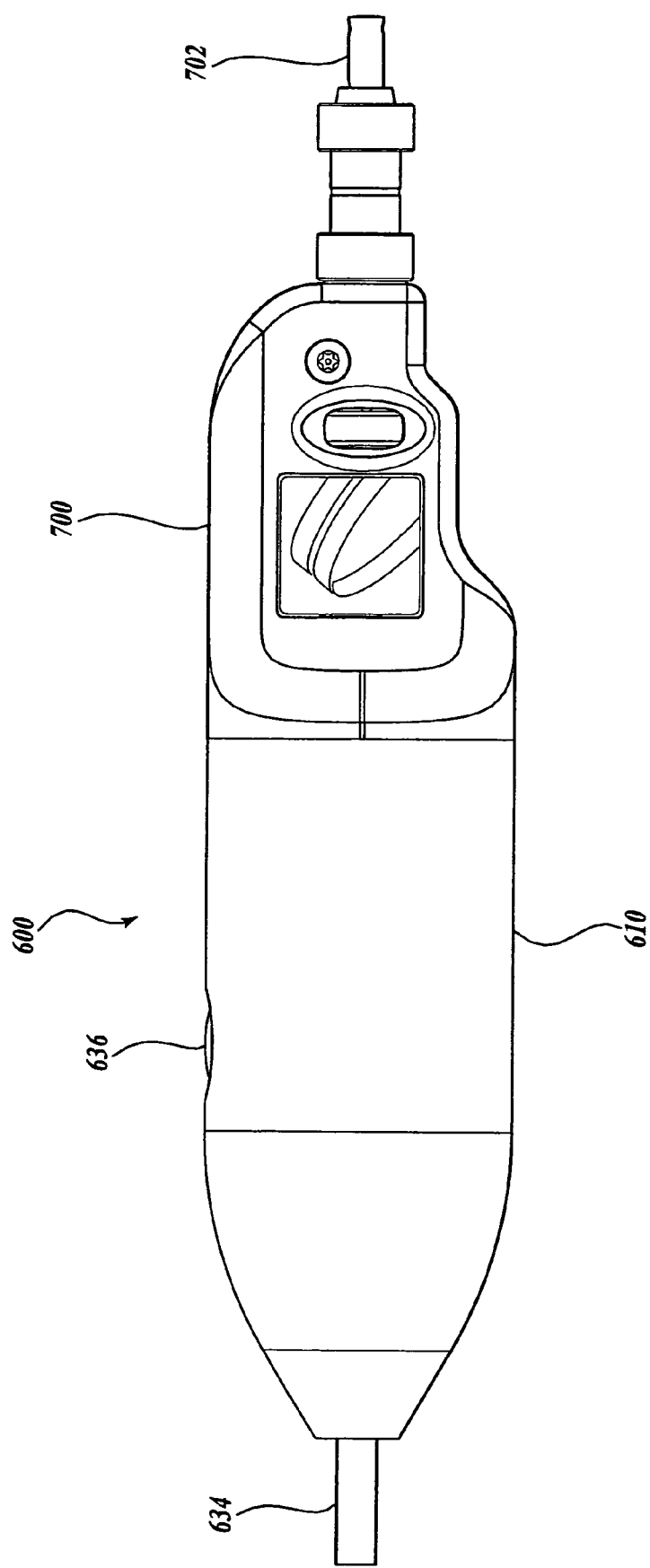
FIG. 5 is a planar elevation view of another alternate embodiment of a fiber-optic cleaning assembly formed in accordance with the present invention, wherein the fiber-optic cleaning assembly further includes a microscope for inspecting fiber-optic endfaces.

Referring now to FIG. 5, a second alternate embodiment of a fiber-optic endface cleaning assembly 600 formed in accordance with the present invention will now be described. The fiber-optic endface cleaning assembly 600 is capable of interfacing with an interface device, such as those typically used in fiber-optic data transmission equipment and depicted in FIGS. 1 and 2, to clean the endfaces of the optical fibers contained therewithin. The fiber-optic endface cleaning assembly 600 of this invention is similar to the embodiment described above and depicted in FIGS. 1 and 2, with the exception that the fiber-optic endface cleaning assembly 600 further includes a microscope 700 integrally formed with the fiber-optic endface cleaning assembly 600 to allow the optical imaging of the fiber-optic endfaces of the fiber-optic strands contained within a connector. Since the optical features of a microscope 700 and the general knowledge of the optical nature of a microscope are well known, these aspects of the fiber-optic endface cleaning assembly 600 will not be further discussed herein.

The microscope 700 is located on a first end of a housing 610 of the fiber-optic endface cleaning assembly 600, opposite a cleaning apparatus interface portion 634 located on a second end. The cleaning apparatus interface portion 634 includes an evacuation system, a cleaning solvent delivery system, and a pressurized fluid delivery system, all of which are substantially similar to those described for the above two embodiments and therefore will not discuss further herein.

In operation, a user selectively inserts either the first or second end within an interface device depending on whether cleaning or inspecting operations are desired. For example, if the user desires to clean a fiber-optic endface contained within the bulkhead adapter, the cleaning apparatus interface portion 634 is inserted within the bulkhead adapter, and an actuator button 636 is depressed to initiate cleaning operations. Upon completion of the cleaning operations, the user would subsequently remove the fiber-optic cleaning assembly 600 and rotate the cleaning assembly 600 end-to-end, followed by the insertion of an interface portion 702 of the microscope 700 within the bulkhead adapter. The interface portion 702 is designed to interface with a bulkhead adapter such that the optical lens of the microscope may focus upon the fiber-optic endfaces contained within the fiber-optic bulkhead adapter.

Referring now to FIGS. 6–12, an alternate embodiment of a fiber-optic endface cleaning assembly 800 formed in accordance with the present invention will now be described. The fiber-optic endface cleaning assembly 800 is capable of interfacing with an interface device, such as a fiber-optic bulkhead adapter 900, to clean the endfaces of the optical fibers contained therewithin. The fiber-optic endface cleaning assembly 800 of this embodiment is similar in operation and structure to the embodiment described above and depicted in FIGS. 1–2, with the exception that the fiber-optic endface cleaning assembly 800 further includes a retractable baffle 802.

Figure 12:
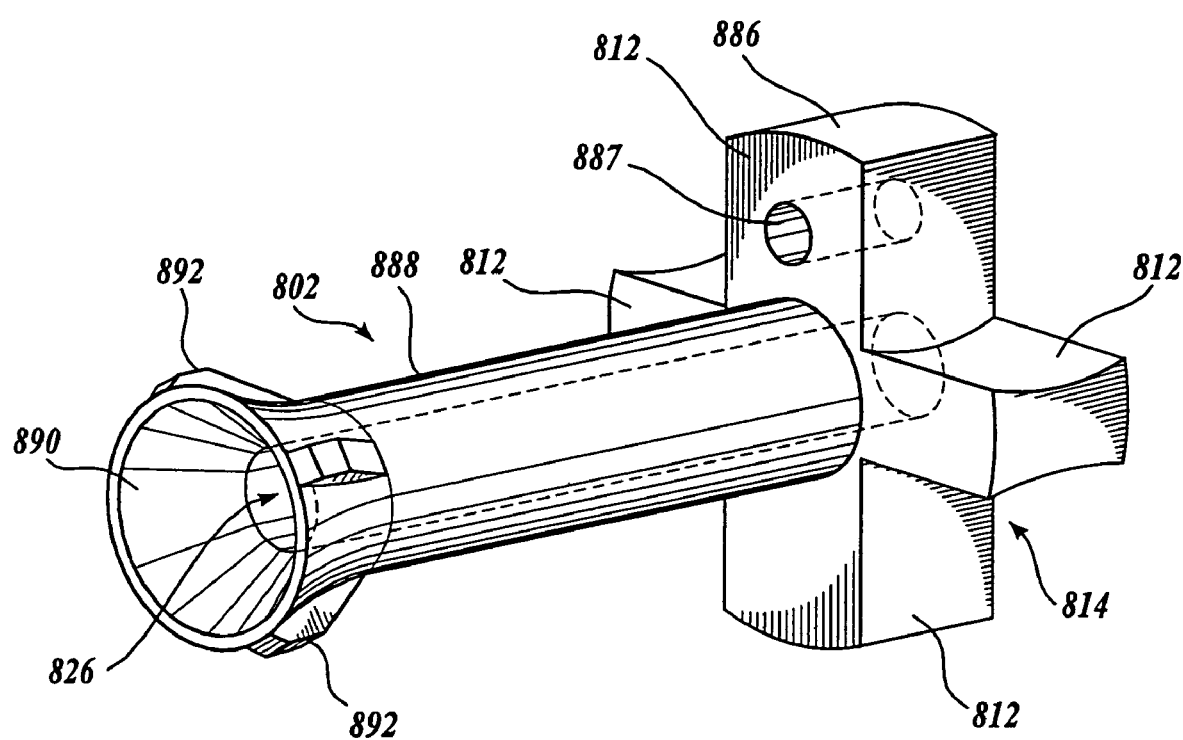
FIG. 12 is a perspective view of the baffle depicted in FIG. 8.

Referring to FIGS. 11 and 12, the baffle 802 aids in the removal of cleaning solvent remaining within an alignment sleeve 822 during a cleaning evolution. Moreover, the fiber-optic endface 902 has a chamfer 904 located around the periphery of the fiber-optic endface 902. It has been found that during cleaning operations, cleaning solvent and/or other fluids may collect in the chamfer 904. The chamfer 904 acts as a protected cavity, partially shielding the cleaning solvent contained therewithin from the pressurized fluid and/or applied vacuum. Thus, while the pressurized fluid is flowing, the fiber-optic endface 902 remains in a clean and dry state. However, when the flow of the pressurized fluid ceases, the cleaning solvent present in the chamfer 904 and any contaminants contained therein flow back onto the fiber-optic endface 902, recontaminating the endface. The retractable baffle 802 of the illustrated embodiment aids in the removal of cleaning solvent from the chamfer by concentrating the flow of the pressurized fluid into the chamfer 904. Thus, when the baffle 802 is in an extended position as shown in FIG. 11, the pressurized fluid more directly impinges the cleaning solvents contained in the chamfer 904, thereby enhancing cleaning solvent removal.

Focusing now more on the outer structure of the fiber-optic endface cleaning assembly 800, and in reference to FIGS. 6–8, the external components comprising the fiber-optic endface cleaning assembly 800 will be described. The fiber-optic endface cleaning assembly 800 includes a housing 810 subdivided into three distinct sections: an interface section 844, a middle section 846, and a baffle actuator section 848. The interface section 844 and the baffle actuator section 848 are joined to the middle section 846 by well known fasteners 840 and 842. Coupled to the interface section 844 is an interface tip 816. The interface tip 816 is a hollow, sometimes cylindrical-shaped structure having outer dimensions substantially similar to the inner dimensions of an entry female input 906 of a fiber-optic bulkhead adapter 900 (see FIG. 9) to allow the insertion of the interface tip 816 therein.

The interface tip 816 is configured to orient the components of the cleaning solvent delivery system and the pressurized fluid delivery system contained within the fiber-optic endface cleaning assembly 800 so that any fluid discharged therefrom will properly impinge the fiber-optic endfaces, as will be discussed in further detail below. Further, the interface tip 816 or some portion of the interface portion 844 is preferably configured to allow the interface tip 816 or at least a portion of the interface portion 844 to be removed from the cleaning assembly 800. Configured as such, the interface tip 816 or some portion of the interface portion 844 may be easily removed and exchanged for a different style of interface tip 816 or interface portion 844 to accommodate a wide variety of interface devices.

Figure 6:
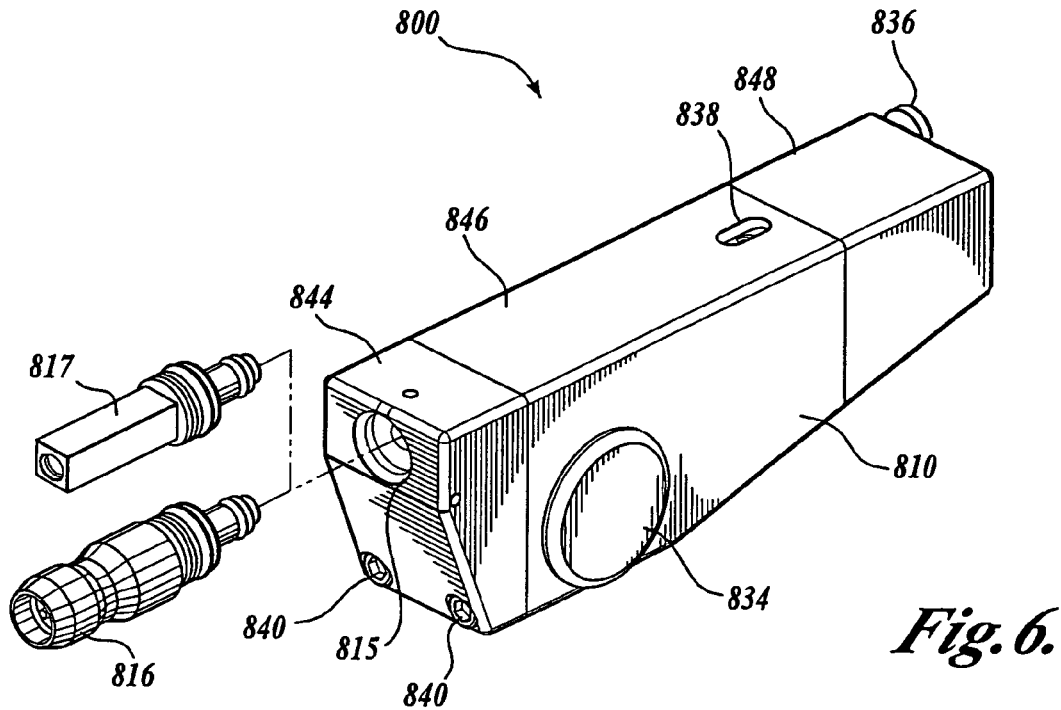
FIG. 6 is an exploded perspective view of yet another alternate embodiment of a fiber-optic cleaning assembly formed in accordance with the present invention, showing an interface section having one of two interchangeable interface tips selectively attachable thereto.
Figure 7:
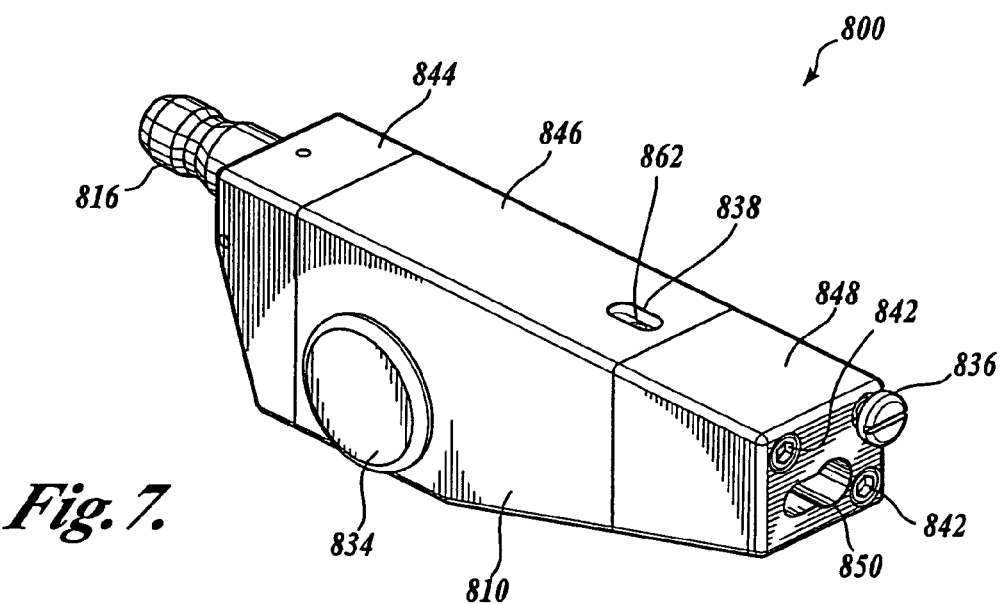
FIG. 7 is a perspective view of the alternate embodiment of the fiber-optic cleaning assembly depicted in FIG. 6, showing a baffle actuator section having a needle valve adjustment screw protruding therefrom.

In the embodiment depicted in FIG. 6, interface tip 816 may be selectively removed from an interface tip receiving port 815 in the interface portion 844 and replaced with an alternately shaped interface tip 817, thereby allowing the cleaning assembly 800 to interface with a fiber-optic endface associated with a different shaped interface device. Thus, fiber-optic endface cleaning assembly 800 may be selectively configured to be compatible with nearly any interface device. As should be apparent to one skilled in the art, although an interchangeable interface tip 816 or interface portion 844 is described with specificity in regard to the above described embodiment only, it should be apparent to one skilled in the art that any of the embodiments described within this detailed description may incorporate this concept therein.

Disposed on the middle section 846 is an actuator button 834 and an access port 838. By pressing the actuator button 834, a user initiates the cleaning process. The access port 838, an oblong aperture in the housing 810, permits access to a set screw 862 disposed within the fiber-optic endface cleaning assembly 800, the purpose of which will be described in further detail below. Further, the access port 838 allows the position of a baffle 802 to be visually confirmed. Further still, the access port 838 allows the manual activation of the baffle between an extended position and a retracted position.

The baffle actuator section 848, as the name implies, houses a baffle actuator 870 for selectively positioning a baffle between extended and retracted positions, as will be described in further detail below. A needle valve adjustment screw 836 for fine tuning the operation of the baffle actuator 870 is disposed on the outer surface of the baffle actuator section 848. Also disposed on the outer surface of the baffle actuator section 848 is an access port 850. The access port 850 allows the passage of an electrical wiring umbilical cord (not shown for clarity) for delivery of electrical control signals and power to select internal components of the fiber-optic endface cleaning assembly 800, such as the baffle actuator 870. Further, the access port 850 allows the passage of a section of pressurized fluid delivery tubing and a section of cleaning solvent delivery tubing (not shown for clarity), substantially similar in operation and structure as the solvent tubing 122 and the pressurized fluid tubing 124 shown in FIG. 1, into the fiber-optic endface cleaning assembly 800.

Focusing now more on the internal structure of the fiber-optic endface cleaning assembly 800, and in reference to FIGS. 8 and 9, the internal components comprising the fiber-optic endface cleaning assembly 800 will be described. The middle section 846 is comprised of a baffle return spring chamber 854 and a solvent delivery valve chamber 860. The baffle return spring chamber 854 is cylindrical in shape and runs longitudinally through the fiber-optic endface cleaning assembly 800. The baffle return spring chamber 854 houses a baffle return spring 852. The baffle return spring 852 biases the baffle 802 in a retracted position, as shown in FIG. 8. The baffle return spring 852 biases the baffle 802 by exerting a spring force upon a rod clamp 864. The rod clamp 864 is reciprocatingly disposed within the baffle return spring chamber 854 and has a spring seat 866 that engages a distal end of the baffle return spring 852 and an actuator seat 868 that communicates with a baffle actuator 870. The rod clamp 864 is coupled to an actuating rod 872 through the use of a well known set screw 862.

Located adjacent to and in a parallel orientation with the baffle return spring chamber 854 is a solvent delivery valve chamber 860. The solvent delivery valve chamber 860 houses a solvent delivery valve return spring 858 and a solvent delivery valve 856. The solvent delivery valve return spring 858 biases the solvent delivery valve 856 in a closed position until actuated by fluid pressure from solvent port 898 into an open position, thereby allowing delivery of a cleaning solvent to the fiber-optic endface 902. Thus, the solvent delivery valve acts as a check valve. As should be apparent to one skilled in the art, the valve configuration herein described may be replaced by any number of actuator/valve combinations well known in the art, such as electromechanical, pneumatic, hydraulic, and mechanical actuators.

Focusing now on the baffle actuator section 848, the baffle actuator section 848 includes an actuator chamber 876. The actuator chamber 876 runs longitudinally through the baffle actuator section 848 and is sized to house the baffle actuator 870. As should be apparent to one skilled in the art, the baffle actuator 870 may be selected from any number of well known actuators in the art such as electromechanical, pneumatic, hydraulic, or mechanical actuators. The baffle actuator 870 may be selectively toggled between an extended position, as shown in FIG. 10, and a retracted position, as shown in FIG. 8. An O-ring 878 is disposed at the distal end of the actuator chamber 876 at the interface between the middle section 846 and the baffle actuator section 848. The O-ring 878 provides a pressure resistant seal to isolate the air volume within the actuator chamber 876. Also disposed on the baffle actuator section 848 is the needle valve adjustment screw 836. The needle valve adjustment screw 836 is manipulated during manufacture to selectively adjust the operating parameters of the baffle actuator 870, such as the actuation rate of the baffle 802.

Focusing now on the interface section 844, the interface section 844 is comprised of a fiber-optic endface receiving chamber 880 sized to receive a protective housing 926 that partially encompasses the fiber-optic endface 902 and alignment sleeve 822. Disposed in an annular channel formed on the inner wall of the fiber-optic endface receiving chamber 880 is a well known O-ring 884. The O-ring 884 acts as a seal between the protective housing 926 of the alignment sleeve 822 and the fiber-optic endface receiving chamber 880, thereby impeding the passage of fluids between the protective housing 926 and the inner surface of the fiber-optic endface receiving chamber 880. It should be apparent to one skilled in the art that this seal may alternately be formed by any number of methods well known in the art, or alternately, may be omitted if ambient contamination is not a consideration.

Referring now to FIGS. 8, 9, and 12, disposed within the fiber-optic endface receiving chamber 880 is the baffle 802. The baffle 802 is comprised of a base portion 886 integrally formed to a concentrically oriented hollow cylinder 888. The base portion 886 is formed from four legs 812 disposed radially outward from the cylinder 888 so that each leg 812 is spaced 90° from the closest adjacent legs 812. Thus, relief gaps 814 are formed between adjacent legs 812 for permitting the passage of evacuation gases thereby. The base portion 886 of the baffle 902 is adapted to receive an actuating rod 872 therein. Upon actuation of the actuating rod 872 by the baffle actuator 870, the baffle 802 is reciprocally driven within the fiber-optic endface receiving chamber 880 through the pressure exerted by the actuating rod 872 upon the baffle 802 via the base portion 886.

The cylinder 888 has a flared distal end 890, having guiding members, such as five longitudinally aligned guiding ribs 892 equally spaced around the flared distal end 890. The guiding ribs 892 aid in the alignment of the baffle 802 within the alignment sleeve 822, which partially encloses the endface 902, while still allowing the flow of fluids for removal from the connector 900 between adjacent guiding ribs 892. Although the illustrated embodiment is shown with five guiding ribs 892, it should be apparent to one skilled in the art that other quantities of guiding ribs 892 are suitable for use with the present invention, such as three, four, or six for example.

Passing through a hollow cylindrical passage 826 in the baffle 802 is a pressurized fluid nozzle 896 and a cleaning solvent nozzle 894. The pressurized fluid nozzle 896 and the cleaning solvent nozzle 894 are substantially similar in construction and operation as that of the pressurized fluid nozzle 130 and cleaning solvent nozzle 126 depicted in the FIG. 2, and therefore will not be discussed in further detail here.

In fluid communication with the cleaning solvent nozzle 894 is a cleaning solvent passageway 899. The cleaning solvent passageway 899 is in fluid communication with the solvent delivery valve 856, a solvent port vent 832, and also with solvent delivery tubing, not shown but similar to the solvent delivery tubing 122 shown in FIG. 1. The solvent port vent 832 is open to the atmosphere to allow atmospheric air into the cleaning assembly 800 during solvent flow. Moreover, the solvent port vent 832 aids in solvent flow by impeding vapor lock formation by the introduction of near atmospheric pressure air into the solvent flow. Air entering the solvent port vent 832 during solvent flow is filtered via a filter 830. In the illustrated embodiment, the filter 830 is a 1 micron rated glass fiber filter, although it should be apparent to one skilled in the art that other filters are suitable for use in the present invention, and further, that the filter may be eliminated if ambient contamination is not a consideration.

The solvent delivery valve 856 is situated in the cleaning solvent passageway 899, between the solvent port vent 832 and the cleaning solvent nozzle 894. The solvent delivery valve 856 selectively controls the passage of a solvent to the cleaning solvent nozzle 894. Moreover, the solvent delivery valve 856 is actuated between a flow and no flow condition by fluid pressure applied to solvent port 898 during cleaning.

The operation of the alternate embodiment of the cleaning assembly 800 depicted in FIGS. 6–11 is substantially similar in operation to the cleaning assembly embodiment described above and depicted in FIGS. 1 and 2 with exception of the use of the baffle 802. Inasmuch as the operation is substantially similar to that described above, the aspects of operation substantially similar to that described above will not be further discussed herein. As for the baffle 802, the baffle is actuatable between the retracted position shown in FIG. 8 and extended position shown in FIG. 9. By selectively positioning the baffle 802 as such, the amount of residual cleaning solvent remaining in the connector 900 after a cleaning evolution is substantially reduced.

More specifically and as best seen in FIG. 11, the fiber-optic endface 902 has a chamfer 904 located around the periphery of the fiber-optic endface 902 as discussed above. The retractable baffle 802 of the illustrated embodiment aids in concentrating the flow of the pressurized fluid into the chamfer 904. Thus, with the baffle in the extended position, the pressurized fluid is directed in a flow path 824 which more directly impinges the cleaning solvents contained in the chamfer 904, thereby enhancing cleaning solvent removal during a drying/solvent removal phase of the cleaning evolution, when the pressurized fluid, absent cleaning solvent, is directed at the endface 902.

Inasmuch as the baffle 802 may impede the flow of cleaning solvent and pressurized fluid during cleaning operations, the baffle 802 may be selectively retracted during the application of the cleaning solvent and pressurized fluid so as to allow the unfettered flow of these fluids during cleaning as shown in FIG. 9. Although a retractable baffle is shown, it should be apparent to one skilled in the art that the baffle may be rigidly held in an extended position. Further still, although the illustrated embodiment depicts a baffle of a certain shape and construction, it should be apparent to one skilled in the art that the baffle may take many various forms. For instance, the baffle may be formed by flaring the end of the cleaning solvent nozzle 894 outwards. Therefore it should be apparent to one skilled in the art that the baffle is defined by its ability to enhance the flow of fluids within the chamfer 904 and across the endface 902, and is therefore not limited to the illustrated form shown in FIGS. 8–12.

While the baffle previously described is effective at reducing the volume of solvent retained by the chamfer 904, an alternate treatment of the problem of re-contamination of the fiber endface 902 by flow of the solvent back onto the cleaned surface is to increase the surface tension of the retained fluid. The surface tension may be increased by adding a chemical agent, such as water, during a second fluid application stage, which would tend to minimize the tendency of the retained fluid to wick across the cleaned surface recontaminating the surface. As should be apparent to one skilled in the art, the chemical agent may be delivered upon the endface by any suitable means. For example, the chemical agent may be applied in the same manner as the solvent by simply toggling the solvent delivery tubing between fluid communication with a solvent source and fluid communication with a chemical agent source, as should be apparent to one skilled in the art. Alternately, a third nozzle may be disposed in the housing for discharging the chemical agent directly upon the endface, or for dispensing the chemical agent into the pressurized fluid flow for delivery upon the endface.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A cleaning apparatus comprising:
   (a) a nozzle assembly adapted to be positioned in proximity to an endface of an optical fiber associated with a fiber optic connector in a bulkhead adaptor; and
   (b) a delivery system coupled in fluid communication with the nozzle assembly, wherein the delivery system is adapted to deliver a liquid upon the endface via the nozzle assembly to aid in removal of contaminants on the endface and also adapted to deliver a gas substantially free of the liquid upon the endface via the nozzle assembly to aid in removal of the liquid from the endface;
   wherein the delivery system is configurable between a first position in which the liquid is permitted to be delivered through the nozzle assembly and a second position in which a spring biases a fluid delivery valve in a closed position such that the liquid is impeded from being delivered through the nozzle assembly while the gas is permitted to be delivered from the nozzle assembly.

2. A cleaning apparatus comprising:
   (a) a nozzle assembly adapted to be positioned in proximity to a endface of an optical fiber associated with a fiber optic connector in a bulkhead adaptor;
   (b) a delivery system coupled in fluid communication with the nozzle assembly, wherein the delivery system is adapted to deliver a liquid upon the endface via the nozzle assembly to aid in removal of contaminants on the endface and also adapted to deliver a gas substantially free of the liquid upon the endface via the nozzle assembly to aid in removal of the liquid from the endface; and
   (c) a vacuum port coupled to the nozzle assembly and oriented to be disposed in proximity to the endface, wherein the vacuum port is adapted to be coupled to a vacuum source such that a vacuum may be applied to the endface during cleaning of the endface.

3. A cleaning apparatus comprising:
   (a) a nozzle assembly adapted to be positioned in proximity to a endface of an optical fiber associated with a fiber optic connector in a bulkhead adaptor;
   (b) a delivery system coupled in fluid communication with the nozzle assembly, wherein the delivery system is adapted to deliver a liquid upon the endface via the nozzle assembly to aid in removal of contaminants on the endface and also adapted to deliver a gas substantially free of the liquid upon the endface via the nozzle assembly to aid in removal of the liquid from the endface; and
   (c) a biasing device for biasing at least a portion of the nozzle assembly toward the endface such that when contact occurs between the nozzle assembly and the endface, a biasing force of the portion of the nozzle assembly is overcome and the portion of the nozzle assembly moves relative to the cleaning apparatus.

* * * * *